United States Patent

French

[15] 3,645,432

[45] Feb. 29, 1972

[54] TRANSPORT APPARATUS

[72] Inventor: John J. French, Wayne, N.J.

[73] Assignee: Certex, Inc., Fairfield, N.J.

[22] Filed: Nov. 19, 1969

[21] Appl. No.: 878,089

[52] U.S. Cl. ..............................226/190, 226/195, 242/182

[51] Int. Cl. ..............................B65h 17/20

[58] Field of Search ..............................242/182–184; 226/181–186, 190–192, 195

[56] References Cited

UNITED STATES PATENTS 2,854,235 9/1958 Mursch..............................226/192

2,919,076 12/1959 Buslik et al. ..............................242/133

*Primary Examiner*—Leonard D. Christian

*Attorney*—George E. Kersey

[57] ABSTRACT

Transport apparatus for the automatic positioning of a flexible record-keeping member, such as magnetic tape, with respect to a transducer, such as a read-write head.

The automatic positioning is achieved by the use of a drive capstan which is narrower than the tape and has a crowned driving face. In addition, the capstan is spring-loaded for adjustment with respect to the read-write head. Tension is applied to the tape by way of standard vacuum columns used in a transport unit.

8 Claims, 3 Drawing Figures

INVENTOR
JOHN J. FRENCH
BY George E. Kersey
ATTORNEY

TRANSPORT APPARATUS

BACKGROUND OF THE INVENTION

This invention relates to the transport of flexible record-keeping media, and more particularly, to the transport of magnetic tape used in data processing.

Record-keeping media are used for the storage of information. One such medium is flexible magnetic tape, which is capable of the inexpensive storage of large quantities of information. Access to the tape is provided by a transport unit containing a transducer known as a "read-write" head. During the transport of the tape with respect to the read-write head, information is entered on the tape by "writing" (recording) and extracted by "reading."

When used in data processing, the information carried by the tape is typically "coded" into groups of binary digits ("-bits") which are dealt with one group at a time. For example, in one type of coding, every symbol of the information to be processed is represented by eight binary digits, with an additional bit for check purposes. One bit of each group appears in one of nine parallel "tracks" across the width of the tape, while the groups themselves are written (or read) sequentially. The spacing of the sequential groups along the length of the tape determines their density and hence the information storage capacity of the tape.

It is apparent that unless similar conditions exist when the tape is written and then read, and vice versa, errors will occur. To control the lengthwise movement of the tape, uniform tension is applied to it, typically by vacuum columns, and it is driven at a specified rate of speed by a rotatable capstan.

In addition, however, a conventional capstan tends to produce a side-to-side movement of the tape known as "-dynamic skew." This has an undesirable effect on reading and writing because of misalignment resulting between the tracks of the read-write head and those established on the tape.

Attempts have been made to overcome the effects of skew by employing a special tape guide in the vicinity of the read-write head. Not only is such a guide an additional mechanical appendage that adds complexity and expense to a tape unit, it has proved to be only partially effective.

Accordingly, it is an object of the invention to expedite the accurate transport of flexible record keeping media with respect to a transducer. A related object is to expedite the transport of magnetic tape with respect to a read-write head.

It is a further object of the invention to reduce the skew that occurs during the transport of flexible record keeping media, particularly the skew that attends the transport of magnetic tape by a drive capstan.

Still another object of the invention is to eliminate the need for a guide mechanism in the transport of record keeping media. A related object is to eliminate the need for a tape guide in a tape transport unit.

SUMMARY OF THE INVENTION

In accomplishing the foregoing and related objects, the invention provides for the modification of the drive mechanism in a unit for transporting a record-keeping medium to achieve automatic-positioning of the medium with respect to a transducer such as a read-write head.

To achieve the desired modification, the drive mechanism, such as a capstan, is proportioned to produce a self-centering effect by having an elevated central portion. The resultant ridge or crown, in conjunction with the tension applied to the tape, produces a fold of the tape about the capstan with the result that the tape tends to be guided from its center, rather than from its edge.

In accordance with one aspect of the invention, the width of the capstan is less than that of the tape to enhance the self-centering effect. In accordance with another aspect of the invention, the drive surface of the capstan is formed by a rounded drive member such as a tire of elastomeric material. One such material which has proved operable at relatively high rates of speed is gum rubber.

In accordance with a further aspect of the invention, the capstan is spring loaded and adjustable with respect to the read-write head.

In accordance with a still another aspect of the invention, the tension applied to the tape by the tape unit, such as by vacuum columns, achieves a fold of the tape about the drive surface of the capstan which is sufficiently great to provide suitable contact, but does not cause plastic deformation of the tape.

BRIEF DESCRIPTION OF THE DRAWINGS

Other aspects of the invention will become apparent after consideration of an illustrative embodiment, taken in conjunction with the drawings, in which.

DESCRIPTION OF AN ILLUSTRATIVE EMBODIMENT

Figure 1:
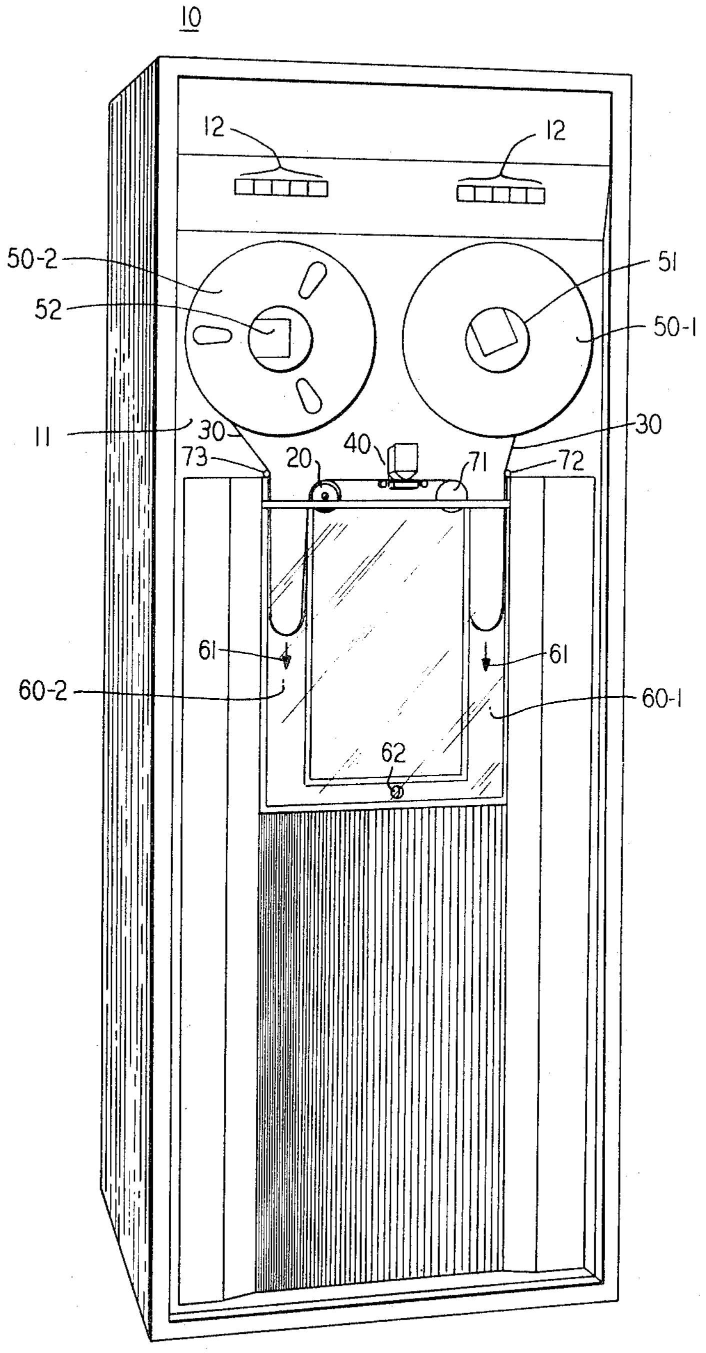
FIG. 1 is a perspective view of a unit for transporting magnetic tape in accordance with the invention.

Turning to FIG. 1 of the drawings, a tape transport unit 10 in accordance with the invention includes a drive mechanism 20, in the form of a capstan, which controls the movement of a record-keeping medium 30, such as a strip of tape, with respect to a transducer 40. When the strip 30 is of magnetic tape, the transducer 40 includes a read-write head. The drive mechanism 20 is proportioned to provide for the self centering of the magnetic tape 30 with respect to the read-write head.

Tension is applied to the tape 30 by downward forces on tape loops in vacuum columns 60–1 and 60–2 in the direction indicated by the arrows 61. This tension on the tape 30 permits its controlled advance by the drive capstan 20 from a demountable supply reel 50–1 on a hub 51 to a demountable takeup reel 50–2 on a hub 52. A reverse direction of drive for the capstan 20 permits the tape to be rewound.

In addition, the path taken by the tape includes standard-bearing surfaces at various positions. Thus there are bearing surfaces 71 and 72 at the exit and entry points of the first vacuum column 60–1, and a bearing surface 73 at the exit of the second vacuum column 60–2. Other bearing surfaces, described below, are included in the vicinity of the transducer 40.

The various constituents of FIG. 1 are on a recessed front panel 11 of unit 10. The interior of the unit 10 includes motors of conventional design for driving the takeup and supply reels 50–1 and 50–2 and the capstan 20. Also included is a vacuum pump which applies suction to the columns 60–1 and 60–2 through an inlet 62. Control of the unit 10 is exercised by a suitable set of pushbuttons 13.

To initialize unit 10 for operation, a loaded supply reel 50–1 is mounted on the hub 51 and the leader end of the tape is "threaded" by being led into the first vacuum column 60–1, beneath the transducer 40, over the capstan 20, into the second vacuum column 60–2 and onto the takeup reel 50–2. During operation of the unit 10, the tape 30 is advanced and rewound as needed to either read or write information at selected positions. As shown in FIG. 1, the tape is near its "EOT" (end of tape) position after having been advanced from its "BOT" (beginning of tape) position.

Figures 2A, 2B:
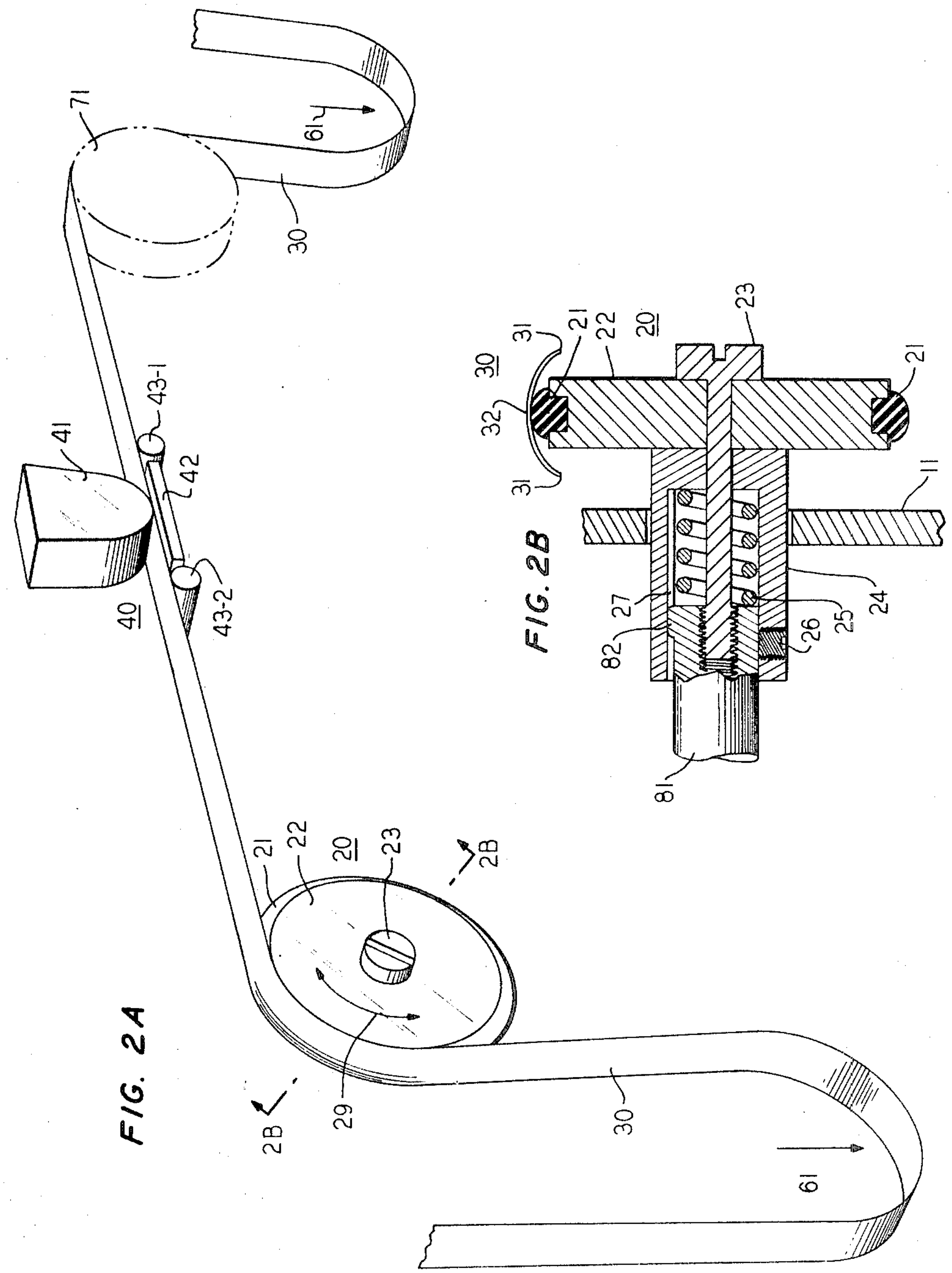
FIG. 2A is a partial perspective view showing a drive capstan proportioned in accordance with the invention, together with a read-write head and a portion of the magnetic tape in the unit of FIG. 1.
FIG. 2B is a cross-sectional view of the drive capstan of FIG. 2A.

A detailed view of that portion of the tape unit 10 which is specifically associated with the operation of the modified capstan 20 in accordance with the invention is shown in FIG. 2A. The tape 30, at the drive capstan has what is known as a 90° wrap. In addition, because of the curvature of the drive surface of the capstan 20 there is a side-to-side fold of the tape. The capstan 20 is rotated in either a clockwise or a counter-clockwise direction, as indicated by the double-headed arrow 29, to either rewind or advance the tape.

At the exit of the first vacuum column, the bearing structure 71 is shown in phantom outline. This structure may be an ordinary bearing post, or it may be similar to the modified capstan 20 in those cases where one capstan is reserved for counterclockwise rotation to advance the tape 30, while a separate capstan is rotated in a clockwise direction to rewind the tape. Alternatively, the structure 71 may be a rotating disc which provides a suitable bearing surface with a 90° wrap for the tape 30.

It will be appreciated that other dispositions of both the capstan 20 and the bearing structure 71 may be made so that the wrap of the tape 30 may be different from what is shown.

The particular read-write head 41 of the transducer 40 illustrated in FIG. 2A is of the constant radius type which is used for tape speeds on the order of 37½to 45 inches per second ('-'ips"). In order to achieve a suitable wrap of the tape 30 with respect to the head 41, two bearing posts 43–1 and 43–2 are mounted on opposite sides of a platform 42. When the unit 10 is operating properly, the posts 43–1 and 43—2 establish a suitable contour of the tape 30 with respect to the head 41, with a small gap between the lower surface of the tape 30 and the upper surface of the platform 42.

As indicated in FIG. 2A, the face of the capstan 20 includes a ridge 21 above a body portion 22 to produce a fold of the tape over a portion of the capstan. As a result, only the central portion of the tape 30 is in contact with the capstan, 20 so that the tape has a tendency to be guided from its center, rather than from an edge, as has been standard practice in the past. The result is an appreciable reduction in the amount of skew, even at high tape speeds.

It is also to be noted that the tension applied to the tape 30 by the vacuum columns 60–1 and 60–2 in the directions indicated by the arrows 61 tends to be standard in the industry and illustratively produces 8 ounces of tension. Given this tension, the capstan 20 is proportioned so that the fold of the tape over the ridge 21 does not cause plastic deformation of the tape.

When the invention is to be employed above 45 ips, a corresponding change is made in the read-write head. For example, at speeds approaching 200 ips, the head 20 has an apex contour for proper operation. Illustrative rewind speeds range from 400 to 500 ips.

Further details of the drive capstan 20 are illustrated in FIG. 2B, which illustrates the way in which the tape 30 becomes folded about the drive surface 21 with its edges 31 below its central portion 32 to achieve a center-guide and transport of the tape 30.

Without adopting any particular theory to explain the self-centering achieved in accordance with the invention, one explanation is that the envelopment of the tape about the capstan 20, short of producing plastic deformation of the tape, tends to keep the tape centered and develop a counterbalancing effect as the tape moves off center. FIG. 2B also shows an adjusting mechanism for properly positioning the capstan 20 with respect to the tape head 41 of FIG. 2A. For that purpose there is an adjusting screw 23 which threads into the shaft 81 of a drive motor. A cup 24 attached to the capstan 20 receives the shaft 81 and includes a spring 25. Rotational slippage of the capstan 20 is prevented by the use of a key way 27 and a key 82. A setscrew 26 fixes the capstan 20 in the proper lateral position. For the particular embodiment of FIG. 2B, the body 22 of the capstan 20 has a peripheral groove into which a rounded drive tire 21 of elastomeric material has been set. The drive tire 21 desirably has the property of producing a good contact with the driven tape 20 and one such suitable material for the drive tire 21 is gum rubber.

While various aspects of the invention have been set forth by the drawings and specification, it is to be understood that the foregoing detailed description is for illustration only and that various changes in the constituents, as well as the substitution of equivalent for those shown and described, may be made without departing from the spirit and scope of the invention.

What is claimed is:

1. Apparatus for transporting magnetic tape between a supply reel and a takeup reel, comprising:
   - a capstan for driving the magnetic tape from one reel to the other, the width of said capstan being narrower than the width of said magnetic tape;
   - and means for applying tension to said magnetic tape with respect to said capstan to produce a side-to-side fold of said magnetic tape over said capstan;
   - thereby to provide self-centering for said magnetic tape during the drive thereof.
2. Transport apparatus as defined in claim 1 wherein said capstan has a drive surface with the central portion rising above the remainder thereof and in contact with said magnetic tape.
3. Transport apparatus as defined in claim 2 wherein said drive surface includes a central ridge.
4. Transport apparatus as defined in claim 3 wherein the material of said drive surface is elastomeric.
5. Transport apparatus as defined in claim 4 wherein the elastomeric material includes gum rubber.
6. Transport apparatus as defined in claim 1 further including a transducer for the entry of information upon said magnetic tape and its removal therefrom and said capstan is adjustable with respect to said transducer.
7. Transport apparatus as defined in claim 6 wherein said capstan is driven by a motor shaft, a cup is attached to said capstan to receive said shaft, and a spring is included within said cup-encircling said shaft to provide spring tension to facilitate the precise positioning of said capstan with respect to said transducer.
8. Transport apparatus as defined in claim 2 wherein said capstan has a peripheral groove into which is set a drive tire of elastomeric material, said drive tie having a convex-driving surface in contact with the central portion of a concave driven surface of said magnetic tape.

* * * * *